US006680556B2

(12) United States Patent
Menz et al.

(10) Patent No.: US 6,680,556 B2
(45) Date of Patent: Jan. 20, 2004

(54) BASE PLATE FOR A CARBON BRUSH INCLUDING MEANS FOR ENGAGING AND DISENGAGING THE BRUSH

(75) Inventors: Bertram Menz, Wetzlar (DE); Matthias Domes, Woellstadt (DE)

(73) Assignee: Schunk Metall und Kunststoff GmbH, Wettenberg (DE)

(*) Notice: Subject to any disclaimer, the term of this patent is extended or adjusted under 35 U.S.C. 154(b) by 0 days.

(21) Appl. No.: 09/770,676

(22) Filed: Jan. 29, 2001

(65) Prior Publication Data

US 2002/0017826 A1 Feb. 14, 2002

(30) Foreign Application Priority Data

Jan. 29, 2000 (DE) ........................................ 100 03 901

(51) Int. Cl.[7] ........................ H02K 13/00; H02R 39/42; H01R 39/38; H01R 39/40

(52) U.S. Cl. ....................... 310/239; 310/240; 310/242; 310/245

(58) Field of Search ................................ 310/239, 240, 310/242, 245

(56) References Cited

U.S. PATENT DOCUMENTS

| | | | | | |
|---|---|---|---|---|---|
| 3,219,860 | A | * | 11/1965 | Redick | 310/239 |
| 3,628,075 | A | * | 12/1971 | Dafler | 310/239 |
| 3,968,391 | A | * | 7/1976 | Blank | 310/240 |
| 4,293,789 | A | | 10/1981 | King | 310/239 |
| 4,341,967 | A | * | 7/1982 | Iwaki | 277/409 |
| 4,658,321 | A | * | 4/1987 | Lindner | 361/25 |
| 4,673,837 | A | * | 6/1987 | Gingerich et al. | 29/597 |
| 4,847,528 | A | * | 7/1989 | Eguchi et al. | 310/239 |
| 4,994,701 | A | * | 2/1991 | Bulick | 310/239 |
| 5,059,846 | A | * | 10/1991 | Concannon | 310/239 |
| 5,495,134 | A | * | 2/1996 | Rosenblum | 310/239 |
| 5,689,148 | A | * | 11/1997 | Rubenchik | 310/239 |
| 5,734,219 | A | * | 3/1998 | Horski et al. | 310/240 |
| 5,773,907 | A | * | 6/1998 | Rubinchik | 310/248 |
| 5,886,448 | A | * | 3/1999 | Yoshida | 310/249 |
| 6,124,652 | A | * | 9/2000 | Karasa et al. | 310/50 |
| 6,133,665 | A | * | 10/2000 | Prell et al. | 310/239 |
| 6,246,144 | B1 | * | 6/2001 | Hockaday et al. | 310/242 |

FOREIGN PATENT DOCUMENTS

| | | |
|---|---|---|
| DE | 8427601 | 5/1985 |
| EP | 0236254 | 9/1987 |

* cited by examiner

*Primary Examiner*—Nestor Ramirez
*Assistant Examiner*—Julio Cesar Gonzalez
(74) *Attorney, Agent, or Firm*—Dennison, Schultz & Dougherty

(57) ABSTRACT

A brush holding apparatus for at least one carbon brush includes a support plate with at least one brush guide, a spring element constructed and arranged for urging a carbon brush having a longitudinal axis mounted in the brush guide in a direction towards a commutator or slip ring, and a retaining element constructed and arranged for retracting the carbon brush against a force exerted by the spring element or for releasing the brush. The retaining element is slidably supported by the base plate in a direction perpendicular to the longitudinal axis of a carbon brush mounted in the brush guide.

10 Claims, 3 Drawing Sheets

Section B-B
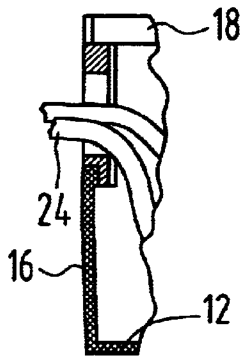
FIG. 3
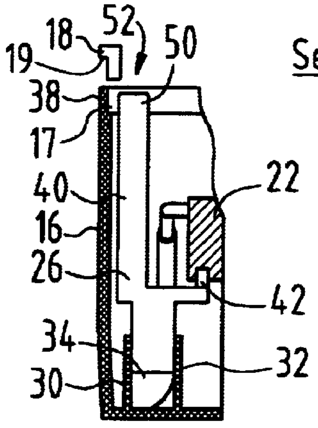
FIG. 4
Section C-C
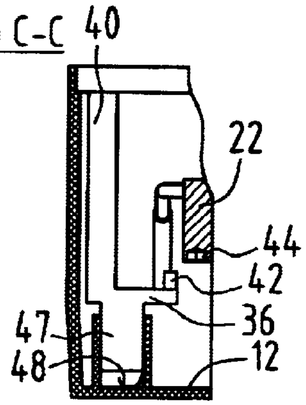
FIG. 5
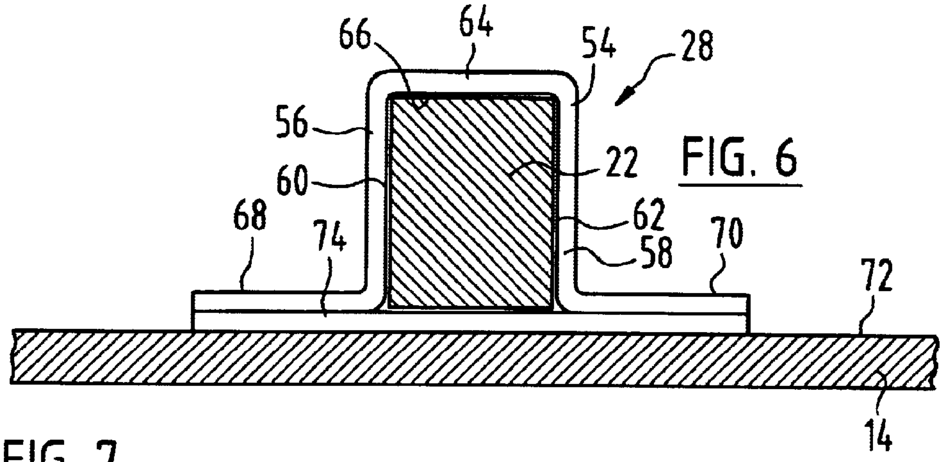
FIG. 6
FIG. 7
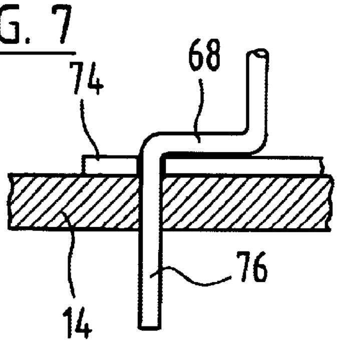
FIG. 8
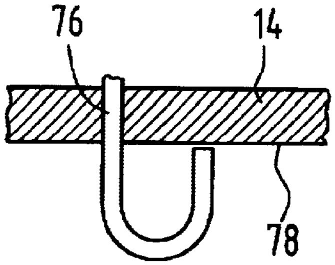
FIG. 9
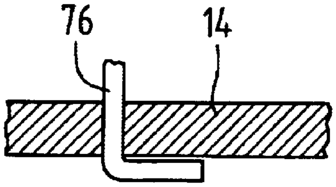
FIG. 10
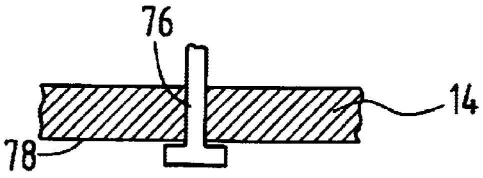

FIG. 11
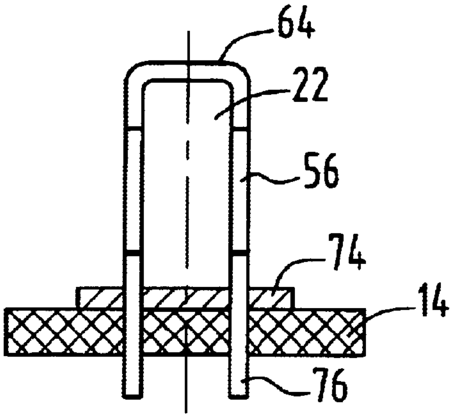
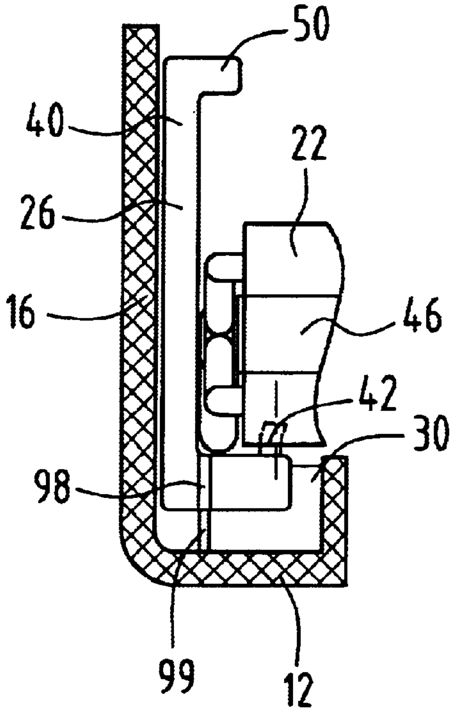
FIG. 12
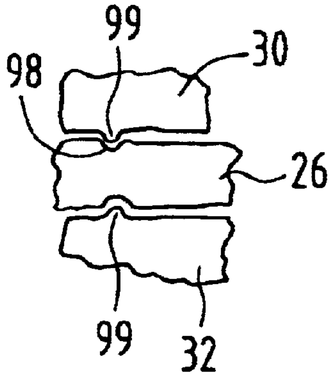
FIG. 13

BASE PLATE FOR A CARBON BRUSH INCLUDING MEANS FOR ENGAGING AND DISENGAGING THE BRUSH

BACKGROUND OF THE INVENTION

The invention relates to a base plate for at least one carbon brush, comprising a carbon brush guide that extends outward from the base plate, a spring element via which the carbon bush can be pushed in the direction of a commutator or slip ring, and a retaining element that serve to hold the carbon brush back against the force generated by the spring element.

One known-in-the-art brush holder is disclosed in EP 0 236 254 B1, in which a disc-shaped retaining element is connected via breakable tabs to carbon brush tubes, allowing the brush holder to be pushed back into an armature shaft with a commutator, without the carbon brushes getting in the way. In its mounted position, then, by breaking the tabs, the retaining element can be removed, allowing the carbon brushes to become engaged against the commutator by the force of a spring. A similar retaining element is used with a brush holder in U.S. Pat. No. 4,293,789, however in this case the retaining element is not connected to the carbon brush tubes or guides. In DE-GM 84 27 601, a hammer brush holder system for a commutator motor is described, in which the brush holder is connected via a course-disrupting crosspiece, which allows the carbon brushes, which extend outward from the brush holders, to act on the commutator via spring force.

The retaining elements used in the known-in-the-art brush holders or base plates always require two carbon holders to maintain the carbon brushes, which are mounted such that they can shift in the retaining elements, in their retracted position during assembly. Furthermore, with the exception of the hammer brush-holder system, the retaining elements extend outward from the ends of the carbon brush holders, which can cause interference during assembly.

SUMMARY OF THE INVENTION

The object of the present invention is to develop an improvement on a base plate of the type described above, such that with simple design alterations it will be possible to maintain a carbon brush in its retracted position during assembly, without this in itself causing interference during assembly. It should further be possible to align the retaining element specifically with one carbon brush, without requiring several carbon brush guides at the same time.

The object is essentially attained in accordance with the invention in that the retaining element is mounted in the base plate such that it can be shifted, and such that when the carbon brush is retracted, the retaining element is engaged in a recess in the base plate.

In contrast to the current state of the art, the carbon brush is not attached to an adjacent retaining element, rather it is attached via a retaining element that becomes engaged in the carbon brush itself. This allows the end area of the carbon brush to be completely free, thus excluding interference during assembly. More importantly, it also makes it possible to retract the carbon brush completely into the carbon brush guide, as the recess may be positioned at the back of the carbon brush, for example, with a retaining element that also is positioned at the back.

In a further development of the invention, the base plate, which may be cupular or pot-shaped, can be covered with an element which, when the base plate is covered, causes the retaining element to become disengaged from the carbon brush. This element may be a cap or ring-shaped element, but is preferably an element that is connected to a motor frame, such as a centering element or border.

A further proposal provides for the retaining element to be positioned in a base plate guide that runs perpendicular or essentially perpendicular to the lengthwise axis of the carbon brush, such that the retaining element can be shifted in this guide, and can be braced against this guide via a spring element. In this manner, the retaining element can be forced in the direction of the carbon brush via the spring element. Alternatively, the retaining element can be wedged via an automatic self-locking device.

The retaining element itself is equipped with a pin-or cylinder-shaped extension on its side that faces the carbon brush, which, when the carbon brush is retracted, becomes engaged in the recess in the manner of a pocket hole.

The retaining element is equipped with a section that extends along a wall that extends outward from the bottom of the base plate and runs around the circumference of the base plate, and that is preferably rectangular in its cross-section; this first section graduates to a center section that run perpendicular to the first, and from which extend the pin-shaped extension, and, on its opposite side, a second section that is positioned in the guide that extends outward from the bottom.

The guide can be formed by two parallel, bar-shaped partitions, wherein, the spring element is positioned inside the guide, between the second section of the retaining element and the bottom of the base plate.

In a more novel embodiment of the invention, the carbon brush guide can comprise a U-shaped metal element, with knee-angled sections that run parallel to the bottom of the base plate, or parallel to the partitions in the base plate which run parallel to the bottom of the base plate, wherein the cross-section of the area surrounded by the U-shaped section of the metal element corresponds to that of the carbon brush. Alternatively, this section may penetrate directly through the base plate, in other words without the sections that extend parallel to the base plate.

The ends of the knee-angled sections of the U-shaped metal element may also extend through the partition.

It is preferably provided, however, that in order to form the U-shape, the carbon brush guide may be comprised of a first section that extends along the opposite side walls and the end wall of the carbon brush, and a second section that extends outward from the side legs of the first section, wherein the legs of the second section extend, at least in part, parallel to the bottom or the partition of the base plate. In addition, each leg of the second section may comprise a first leg section that extends along the bottom or the partition, and a second, outer leg section that extends through the bottom or the partition.

A further development of the invention provides for a plate-shaped metal element to extend between the carbon brush and the bottom or the partition wall, along which the carbon brush can slide, with this plate-shaped element being connected to the U-shaped metal element and/or penetrated by its second section. In this, the free ends of the legs of the U-shaped metal element that extend through the base or partition wall can be bent around, bent at right angles, or otherwise secured in order to attach or mount the legs to the surface of the bottom or the side wall that lies opposite the carbon brush.

In particular, the invention provides for an automatic release of the retaining element when the base plate is covered with the covering element, since the first section of the retaining element juts out over the edge of the base plate in the carbon brush holding position, and when the base plate is closed it is pushed back against the spring force that is acting against the retaining element, to such an extent that the cylinder or pin-shaped section becomes disengaged from the carbon brush, causing the brush to be shifted via the force of the spring in the carbon brush guide, in the direction of the commutator or slip ring.

The base plate specified in the invention is particularly well suited for use in motors in which an exchange of carbon brushes is not required, for example sporting devices such as treadmills, golf carts, etc. There are no limitations to its use in other applications, however, since a design that complies with the teaching of the invention can be used in a multitude of ways.

Because the retaining element can be shifted perpendicular to the lengthwise axis of the carbon brush, and especially because it can become engaged at the back, the end area of the carbon brush in the recess that is located there, in the manner of a pocket hole, a problem-free assembly of the carbon brush guide with carbon brushes can take place, without any interference by the retaining element such as is caused with known-in-the-art disc-type elements that are mounted at the end of the carbon brush guide.

BRIEF DESCRIPTION OF THE DRAWINGS

Further details, advantages and features of the invention are given not only in the claims, in the characteristics found therein—alone and/or in combination—, but also in the following description of the preferred exemplary embodiments found in the diagrams.

These show:

FIG. 3 a cross-section along the Line B—B in FIG. 1,

FIG. 4 a cross-section along the Line C—C in FIG. 1, with cover element removed, FIG. 5 a cross-section along the Line C—C in FIG. 1, with cover element in place, FIG. 6 a basic diagram of a carbon brush guide FIGS. 7–11 designs for possible methods of mounting the carbon brush guide FIG. 12 a cross-section of the base plate from the rear area of a carbon brush FIG. 13 details of a retaining element

DESCRIPTION OF THE PREFERRED EMBODIMENTS

Figure 2:
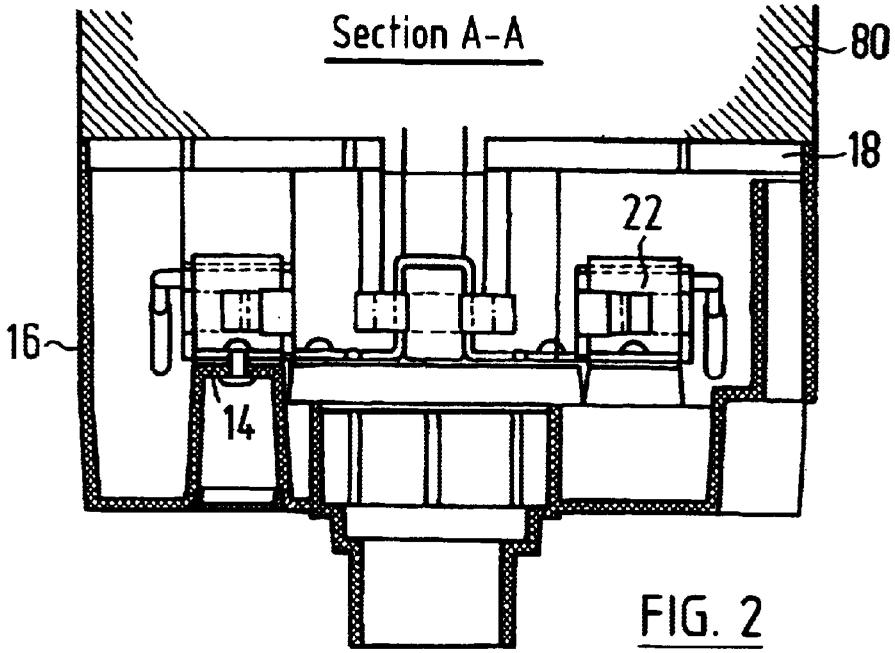
FIG. 2 a cross-section along the Line A—A in FIG. 1.
Figure 1:
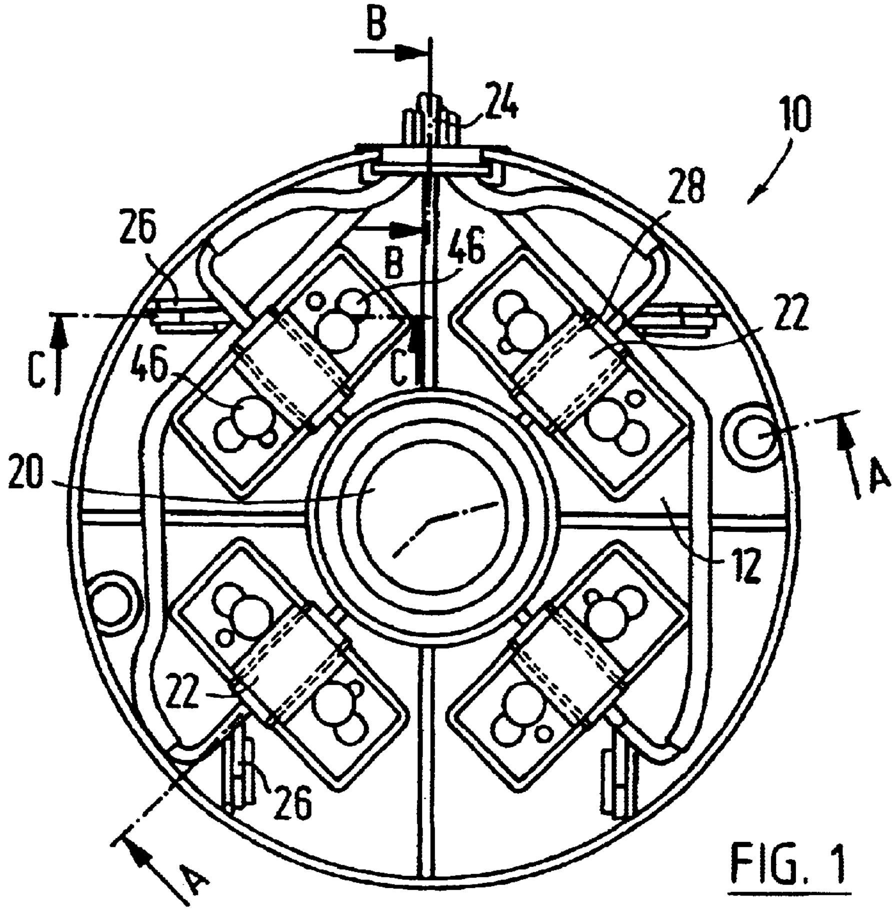
FIG. 1 an overhead view of a base plate.

FIG. 1 shows an overhead view of a base plate 10 of a carbon brush holding device, which may be made, for example, of plastic, such as a thermoplastic. The base plate 10 is equipped with a disc-shaped ground wall 12 with a partition wall 14 that projects from this base, and a margin or side wall 16 that extends around the circumference of the base, with an inner step 17 that extends along the edge. On the side wall 16, centered over the step 17, an element such as a centering element 18 of a motor casing 80, for example, can be placed upon the base plate 10, which in this case is pot-shaped; this centering element is connected to or extends from a motor casing, or is a part of the motor casing. This serves to protect the elements taken up in the base plate 10 and the motor casing 80. The centering element 18 is also equipped with a centering notch 19.

The base plate 10 is equipped with a central boring 20, through which an armature shaft that is equipped with a commutator, not illustrated here, can be inserted. In the exemplary embodiment, a total of four carbon brushes 22 are directed toward this, which can be connected via electrical conductors 24 to a voltage supply. In addition, the circuitry for the carbon brushes 22 may be connected as desired, in accordance with the prior art. This will be limited, however, to sufficiently known-in-the-art constructions and designs.

In order to mount the carbon brush holder or the brush holders, and to direct the carbon brushes 22 toward the commutator bars of a commutator or a slip ring, the carbon brushes 22 are first pulled back to a retracted position, each in its own carbon brush guide 28, via a retaining element 26. This serves to ensure that when the base plate 10 is pushed over to the armature shaft, the carbon brushes 22 will not collide with the commutator or the slip rings.

As the detailed diagrams in FIGS. 4 and 5 show, the retaining element 26 is comprised of an element that can be shifted within a guide that is formed from two parallel partitions 30, 32 that extend outward from the ground wall 12; this element—as is clearly shown in the overhead view in FIG. 1—is rectangular in its cross-section, and, as is shown in the side view of FIGS. 4 and 5, comprises a base section 36 from which extend a first section 40 that reaches to the upper, open edge 38 of the side wall 16, and a cylindrical or pin-shaped extension 42 that extends parallel to the first section; the cross-section of this extension corresponds to that of a recess 44 at the back of the carbon brush 22. This provides the possibility that when the pin-shaped extension 42 is engaged in the recess 44 in the carbon brush 22, in the manner of a pocket hole, the carbon brush 22 will be retracted against a spring element that is exerting pressure on the brush in the direction of the commutator or slip ring, like a scroll spring 46.

Opposite the first section 40 and the pin-shaped extension 42 there extends from the base section 36 a second leg 47 that is rectangular in its cross-section, and that extends within the guide 34, which runs perpendicular to the flat piece that is mounted on the ground wall 12. Within the guide 34, in other words between the ground wall 12 and the second section or leg 47 of the retaining element 26, is a spring element 48, via which the retaining element 26 exerts a force in the direction of the upper, open edge 38, that is, in the direction of the carbon brush 22.

If, in keeping with the illustration in FIG. 4, the pin-shaped extension 42 is engaged in the recess 44, which is designed as a pocket hole, then the carbon brush 22 is held in a retracted position within the carbon brush guide 28. At the same time, the retaining element, with its upper, open edge 50, extends to the area of the upper, open edge 38 of the side wall 16. Now when, following the successful positioning of the armature shaft and the commutator, the brush holder, in other words the base plate 10 with its centering element 18 or the motor casing 80, is closed, then—as is shown by a comparison of FIGS. 4 and 5—in closing, in other words by moving the motor casing 80 in the direction of the arrow 52, the retaining element 26 is pressed into the guide 34, against the spring element 48. This causes the extension 42 to become disengaged from the recess 44 in the carbon brush 22, thus releasing the brush. In this manner, the carbon brush 22 is pushed in the direction of the commutator or slip ring within the carbon brush guide 28, via the spring elements, which in the exemplary embodiment are designed as scroll springs 46.

According to an alternative proposal as illustrated in FIGS. 12 and 13, it is not absolutely necessary in mounting the carbon brush 22 for the spring element 48 to exert force against the retaining element 26. Rather, it is possible for the retaining element 26 to become wedged, specifically when the adjustment forces acting against the carbon brush 22 and created by the spring element 46, such as a scroll spring, are sufficient. Thus it is provided that sections of the side walls or parallel partition 30, 32 can interlock with the retaining element 26. To this end, the retaining element 26 may be provided with grooves 98, into which ridges 99 protruding from the side walls or parallel partition 30, 32 become engaged. Other designs are also possible.

In other words, a wedging takes place between the retaining element 26 and the carbon brush with the extension 42 that is positioned within the pocket hole or recess 44, without the danger of an unintended release of the carbon brush 22 in the case of insufficient force in the lengthwise direction of the retaining element 26.

Furthermore, the combined action of the grooves 98 and the ridges 99 at the same time causes an axial guidance of the retaining element 26.

The carbon brush guide 28 itself may be comprised of a U-shaped metal element 54, whose side legs 56, 58 extend along opposite sides 60, 62 of the carbon brush 22. The center leg 64 extends along the top 66 of the carbon brush 22. The side legs 56, 58 are bent outward, with the corresponding outer sections 68, 70 extending parallel to the ground wall 12 or the partition wall 14, to which, in the exemplary embodiment, the carbon brush guide 28 is fastened. The knee-shaped outer sections 68, 70 of the U-shaped metal element 54 extend along a metal element 74 that is positioned on the surface 72 of the partition wall 14 that faces the carbon brush; the carbon brush 22 is supported against this metal element such that it can slide. The metal element 74 and the outer sections 68, 70 of the side legs 56, 58 can be connected or riveted to one another, which also connects them at the same time to the partition wall 14.

Alternatively, in accordance with FIG. 11, the sections 68, 70 which extend parallel to the base or partition wall 14, may be omitted, so that the U-shaped or folded section that encompasses the carbon brush 22, in other words its side legs 56, 58, protrude directly through the wall 14.

In order to enable a secure mounting or fastening of the carbon brush guide 28, the outer sections 68, 70 of the side legs 56, 58 may also be bent, so that they extend with an end section 76 through the metal element 74 and through the partition wall 14, as is shown in FIG. 7 through 10. Thus, as is shown in FIG. 8, the end section can be bent in the direction of the underside 78 of the partition wall 14 that lies opposite the carbon brush. The section 76 may also be bent, as is shown in FIG. 9. It is also possible for the open end of the section 76 to be T-shaped, thus securing it to the underside 78 of the partition wall 14.

We claim:

1. Brush holding apparatus for at least one carbon brush comprising a base plate having a ground wall and including at least one brush guide, a spring element constructed and arranged for urging a carbon brush having a longitudinal axis parallel to the ground wall, mounted in the at least one brush guide in a direction towards a commutator or slip ring, a retaining element mounted to the base plate adjacent to the at least one brush guide and including means for retaining the carbon brush in a retracted position against a force exerted by the spring element, and a removable cover for the base plate, wherein the retaining element is slidably supported by the base plate in a direction perpendicular to the longitudinal axis of a carbon brush mounted in the brush guide, whereby the retaining element is movable between a first position in which the carbon brush may be retained by the retaining element, and a second position in which the carbon brush may be released by the retaining element, the removable cover including means causing the retaining element to become disengaged from the carbon brush when the cover is mounted on the base plate.

2. Apparatus in accordance with claim 1, wherein the base plate includes a guide substantially perpendicular to the longitudinal axis of the carbon brush which slidably receives the retaining element, the retaining element being supported by a spring element against the base.

3. Apparatus in accordance with claim 2, wherein the spring element is constructed and arranged for exerting a force against the retaining element towards a carbon brush mounted in the brush holder.

4. Brush holding apparatus for at least one carbon brush comprising a base plate having a ground wall and including at least one brush guide, a spring element constructed and arranged for urging a carbon brush having a longitudinal axis parallel to the ground wall, mounted in the at least one brush guide in a direction towards a commutator or slip ring, and a retaining element mounted to the base plate adjacent to the at least one brush guide and including means for retaining the carbon brush in a retracted position against a force exerted by the spring element, wherein the retaining element is slidably supported by the base plate in a direction perpendicular to the longitudinal axis of a carbon brush mounted in the brush guide, whereby the retaining element is movable between a first position in which the carbon brush may be retained by the retaining element, and a second position in which the carbon brush may be released by the retaining element, the retaining element comprising a pin or cylindrical extension on a side thereof that faces a carbon brush mounted in the brush holder, which, upon retraction of the carbon brush, becomes engaged in a recess in the carbon brush, in the manner of a pocket hole, wherein upon engagement of the pin of the retaining element in the recess in the carbon brush, an adjustment force created by the spring element against the carbon brush causes the pin to become wedged in the recess, and wherein the retaining element comprises a first, outer section that runs along a side wall extending from an outer edge of the ground wall or an intermediate wall of the base plate and surrounding it, with the first section crossing over into a center section that runs perpendicular to the first section, from which the extension extends, and from which, on an opposite side, a second section extends, which fits into the guide which extends outwardly from the base.

5. Apparatus in accordance with claim 4, wherein the guide is formed by two parallel, wall-like partitions.

6. Apparatus in accordance with claim 5, wherein outer surfaces of the retaining element include lengthwise depressions into which protrusions from the partitions become engaged.

7. Apparatus in accordance with claim 5, wherein the spring element is positioned within the guide and is supported against the base.

8. Base plate for at least one carbon brush comprising at least one brush guide, the brush guide comprising a U-shaped metal element having a center leg extending along a top wall of a carbon brush mounted in the at least one brush guide and lateral legs extending perpendicular to the center leg along side walls of a carbon brush mounted in the brush guide, the lateral legs ending in outer sections which run at least in part parallel to a ground wall of the base plate or an intermediate wall extending parallel to the ground wall, which penetrate the ground wall or intermediate wall and which are attached to a surface of the ground wall or intermediate wall that faces away from a carbon brush mounted in the brush holder, running opposite to the brush guide.

9. Base plate in accordance with claim 8, wherein the outer sections comprise a first portion that extends along the ground wall or intermediate wall and a second portion which extends through the ground wall or intermediate wall.

10. Base plate in accordance with claims 8, further comprising a plate-like metal element extending between the carbon brush and the base plate or intermediate wall, the carbon brush being slidable along said metal element, wherein said metal element is connected to the U-shaped metal element and/or is penetrated by an outer section thereof.

* * * * *